US011996653B2

(12) United States Patent
Baur et al.

(10) Patent No.: US 11,996,653 B2
(45) Date of Patent: May 28, 2024

(54) CONTACT ARRANGEMENT AND DEVICE WITH A BASE PLATE AND A CONTACT ARRANGEMENT ARRANGED THEREON

(71) Applicant: Vitesco Technologies GmbH, Hannover (DE)

(72) Inventors: Frank Baur, Munich (DE); Andreas Bernhardt, Munich (DE)

(73) Assignee: Vitesco Technologies GmbH, Regensburg (DE)

(*) Notice: Subject to any disclaimer, the term of this patent is extended or adjusted under 35 U.S.C. 154(b) by 259 days.

(21) Appl. No.: 17/277,399

(22) PCT Filed: Aug. 27, 2019

(86) PCT No.: PCT/EP2019/072822
§ 371 (c)(1),
(2) Date: Mar. 18, 2021

(87) PCT Pub. No.: WO2020/057913
PCT Pub. Date: Mar. 26, 2020

(65) Prior Publication Data

US 2022/0037833 A1 Feb. 3, 2022

(30) Foreign Application Priority Data

Sep. 21, 2018 (DE) ..................... 10 2018 216 143.7

(51) Int. Cl.
*H01R 13/631* (2006.01)
*H05B 3/06* (2006.01)

(52) U.S. Cl.
CPC ............ *H01R 13/631* (2013.01); *H05B 3/06* (2013.01)

(58) Field of Classification Search
CPC ........ H01R 13/631; H01R 12/57; H05B 3/06; H05B 3/26
See application file for complete search history.

(56) References Cited

U.S. PATENT DOCUMENTS 2,540,037 A * 1/1951 Vough .................. H01R 13/115 439/907
3,273,105 A * 9/1966 Klassen ............... H01R 13/533 439/691

(Continued)

FOREIGN PATENT DOCUMENTS

CN 101454943 A 6/2009
DE 20007740 U1 12/2000

(Continued)

OTHER PUBLICATIONS

Chinese Office Action for Chinese Application No. 201980061817.0, dated Sep. 7, 2022 with translation, 13 pages.

(Continued)

*Primary Examiner* — Abdullah A Riyami
*Assistant Examiner* — Nader J Alhawamdeh
(74) *Attorney, Agent, or Firm* — BUCHANAN INGERSOLL & ROONEY PC

(57) ABSTRACT

A contact arrangement with a flat contact element with an upper side and an underside, the thickness of which decreases toward three of its edges from the upper side to the underside, and with a connecting element, which is electrically and mechanically connected to the contact element and is further away from the underside of the contact element than from its upper side. Also disclosed is a device with a base plate and a contact arrangement arranged thereon and a conductor track, which is formed on the contact element and a region of the base plate.

6 Claims, 2 Drawing Sheets

(56) References Cited

U.S. PATENT DOCUMENTS

| | | | | |
|---|---|---|---|---|
| 6,348,659 | B1 | 2/2002 | Crotzer et al. | |
| 6,351,884 | B1 | 3/2002 | Damaschke et al. | |
| 10,062,633 | B2 * | 8/2018 | Hiratani | H01L 23/3675 |
| 2003/0190846 | A1 | 10/2003 | Costa | |
| 2004/0262712 | A1 | 12/2004 | Doi | |
| 2007/0029301 | A1 | 2/2007 | Tokiwa et al. | |
| 2009/0114372 | A1 * | 5/2009 | Ippoushi | F28F 3/12 165/104.19 |
| 2009/0277671 | A1 | 11/2009 | Hahn | |
| 2018/0033714 | A1 * | 2/2018 | Hiratani | H01L 23/50 |
| 2020/0314965 | A1 * | 10/2020 | Walz | H05B 3/265 |
| 2022/0037833 | A1 * | 2/2022 | Baur | H01R 12/57 |

FOREIGN PATENT DOCUMENTS

| | | | | |
|---|---|---|---|---|
| DE | 102006032114 | A1 | 2/2007 | |
| DE | 102006017675 | A1 | 10/2007 | |
| DE | 202014105356 | U1 | 2/2016 | |
| DE | 112016000688 | T5 | 10/2017 | |
| EP | 1460649 | A1 | 9/2004 | |
| EP | 2741105 | A2 | 6/2014 | |
| FR | 3032388 | A1 * | 8/2016 | F24H 3/0429 |
| GB | 1390532 | | 4/1975 | |
| JP | 0631946 | A | 2/1994 | |
| JP | 06283255 | A | 10/1994 | |
| JP | 08171981 | A | 7/1996 | |
| JP | 2000123888 | A | 4/2000 | |
| JP | 2002056953 | A | 2/2002 | |
| JP | 2017037988 | A | 2/2017 | |
| WO | 2016070995 | A1 | 5/2016 | |
| WO | 2016180394 | A1 | 11/2016 | |

OTHER PUBLICATIONS

International Search Report and Written Opinion for International Application No. PCT/EP2019/072822, dated Nov. 26, 2019, with partial English translation, 9 pages.

International Search Report and Written Opinion for International Application No. PCT/EP2019/072822, dated Nov. 26, 2019, 14 pages (German).

German Examination Report for German Application No. 10 2018 216 143.7, dated Jul. 25, 2019, 4 pages.

Chinese Office Action with Search Report for Chinese Application No. 201980061817.0, dated May 11, 2023, 10 pages.

* cited by examiner

CONTACT ARRANGEMENT AND DEVICE WITH A BASE PLATE AND A CONTACT ARRANGEMENT ARRANGED THEREON

CROSS REFERENCE TO RELATED APPLICATIONS

This application is the U.S. National Phase Application of PCT International Application No. PCT/EP2019/072822, filed Aug. 27, 2019, which claims priority to German Patent Application No. 10 2018 216 143.7, filed Sep. 21, 2018, the contents of such applications being incorporated by reference herein.

BACKGROUND OF THE INVENTION

Resistance structures for electrical heating devices are often designed as conductor tracks on base plates or films. There is often the problem of making contact with these conductor tracks, in particular of connecting lead wires to them. Making contact is particularly problematic when high currents are to flow, as is the case with heating wires or heating cables.

Typical connection methods are soldering, welding or pressing. However, these methods have disadvantages.

SUMMARY OF THE INVENTION

An aspect of the invention is a contact arrangement and a device with a base plate and a contact arrangement arranged thereon, which can be produced easily and reliably.

Accordingly, a contact arrangement has a flat contact element with an upper side and an underside, the thickness of which decreases toward at least three of its edges from the upper side to the underside, and a connecting element, which is electrically and mechanically connected to the contact element and is further away from the underside of the contact element than from its upper side.

Due to this beveled shape of the contact element, it can be arranged with its underside over the entire surface area on a base plate, while its upper side slopes from the center to the edges and toward the base plate and the thickness of the contact element thus tapers, so that a conductive layer applied to the base plate and the upper side of the contact element does not have to span an edge.

In this way, a conductive layer to be applied to a base plate can be connected to the contact element in the same operation. The conductive layer can be applied for example by means of cold gas spraying.

In an advantageous embodiment of the contact arrangement according to an aspect of the invention, the contact element is of a rectangular form, its underside being of a planar form and its upper side being of a convex form.

In one development, the upper side of the contact element may be planar in a central region and run parallel to the underside and straight in the edge regions, so that the thickness of the edge regions tapers constantly toward the edge of the underside. This is a form of a contact element that is easy to produce.

In an advantageous form of the contact arrangement, at least part of the connecting element and part of the contact element are surrounded by a plastic housing.

The plastic housing is used for simple fastening of the contact arrangement and for strain relief.

For this purpose, it may advantageously have bores for fastening to a base plate, for example by means of screws.

Another aspect of the invention is a device with a base plate and a contact arrangement arranged thereon and a conductor track, which is formed on the contact element and a region of the base plate.

In an advantageous manner, the conductor track may be sprayed on. This produces both the conductor track and its connection to the contact arrangement in just one operation.

BRIEF DESCRIPTION OF THE DRAWINGS

An aspect of the invention is explained in more detail below on the basis of exemplary embodiments and with the aid of figures, in which.

DETAILED DESCRIPTION OF THE PREFERRED EMBODIMENTS

Figure 1:
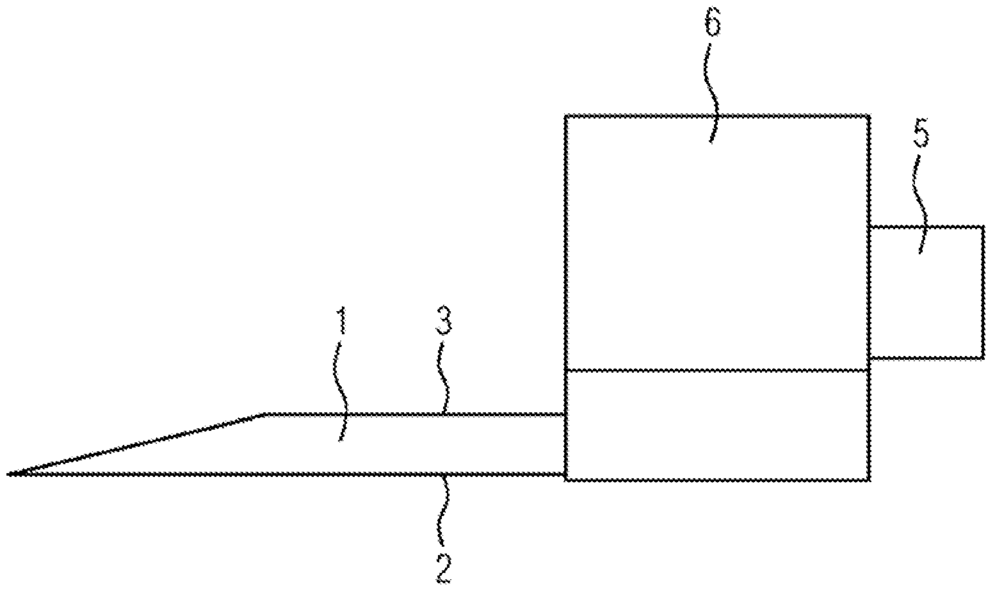
FIG. 1 shows a side view of a contact arrangement according to an aspect of the invention.
Figure 2:
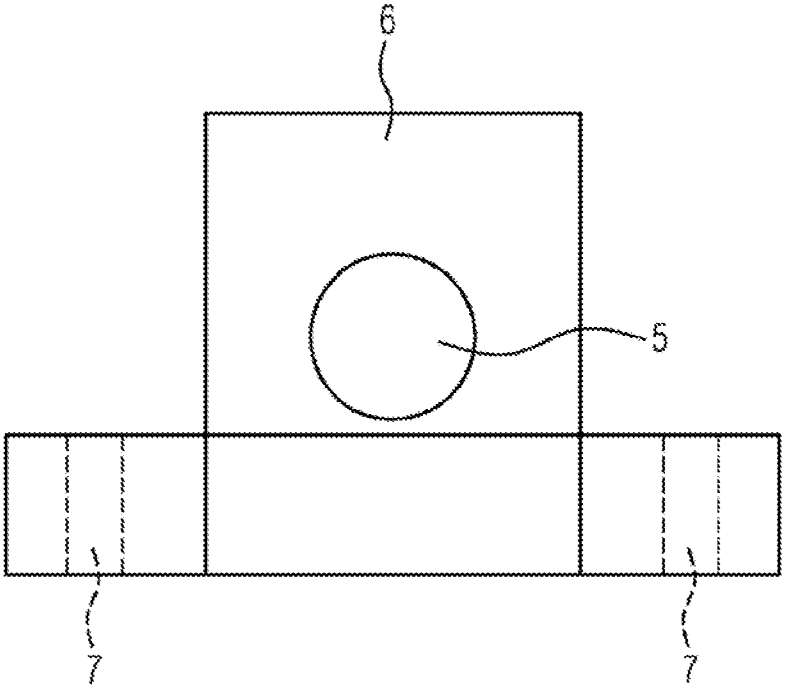
FIG. 2 shows a front view of a contact arrangement according to an aspect of the invention.
Figure 3:
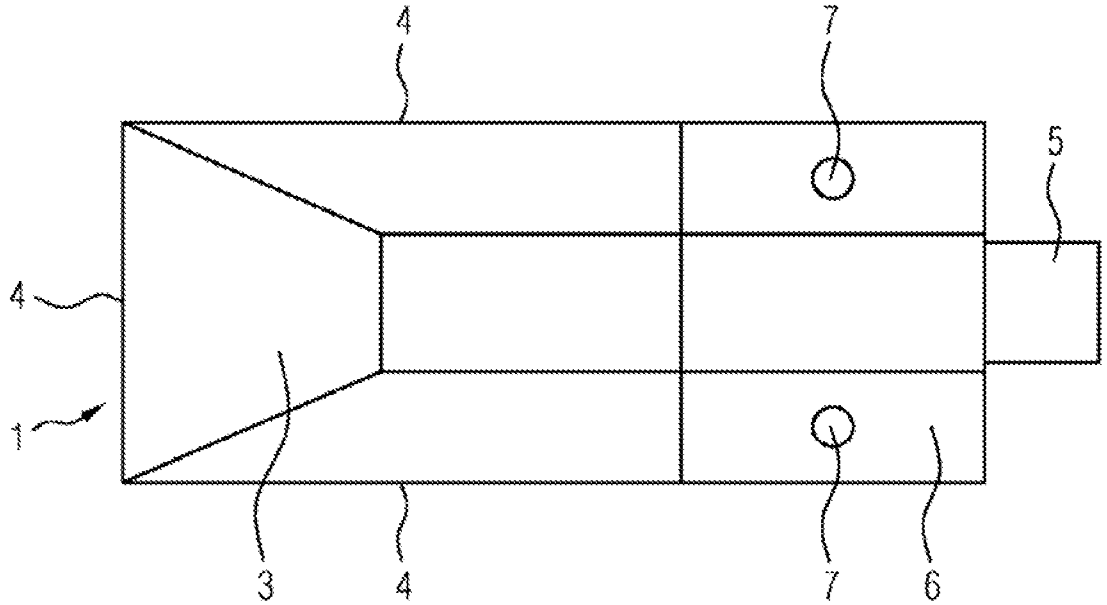
FIG. 3 shows a plan view of a contact arrangement according to an aspect of the invention.

An exemplary embodiment of a contact arrangement according to an aspect of the invention is shown in various views in FIGS. 1 to 3. An electrically conductive contact element 1 has an underside 2 and an upper side 3 as well as edges 4. Starting from a central part of the upper side 3, the latter runs in slopes toward the edges 4, so that a minimum thickness of almost zero is reached there and a continuous transition from a base plate 8 (FIG. 4) to the contact element 1 is therefore obtained.

The contact element 1 is mechanically and electrically connected to a connecting element 5, the connection running within a plastic housing 6. The connecting element 5 is used to connect to cables or the like.

The plastic housing 6 encloses part of the contact element 1 and at least part of the connecting element 5. In the exemplary embodiment shown, this protrudes from the plastic housing 6.

The plastic housing 6 has lateral lugs in which bores 7 are provided in order to screw or rivet the contact arrangement for example to a base plate 8.

Figure 4:
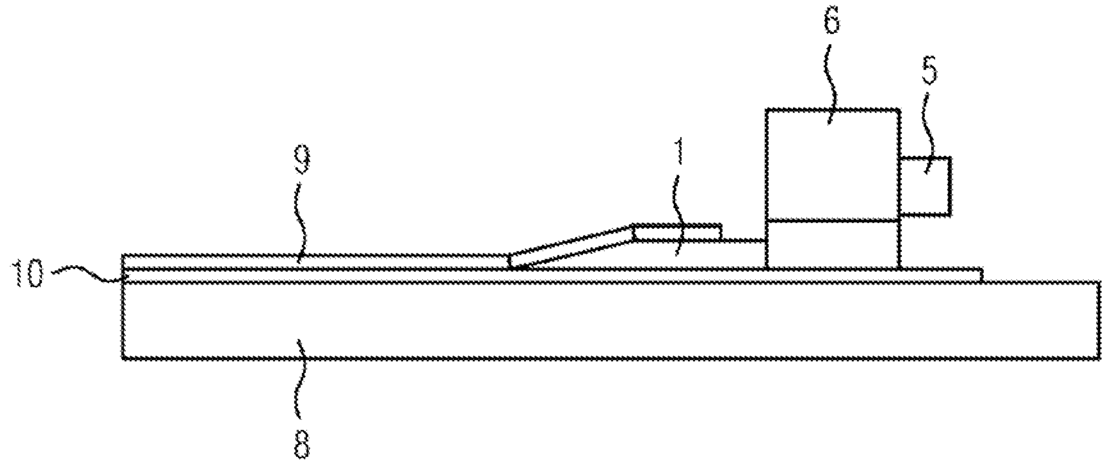
FIG. 4 shows a device according to an aspect of the invention.

FIG. 4 shows a device with a contact arrangement which is arranged on a base plate 8. An insulating layer 10 is applied between the base plate 8 and the contact arrangement.

A conductor track 9 is applied to the free insulating layer 10 and the upper side 3 of the contact element 1 of the contact arrangement, which can be performed for example by means of cold gas spraying.

The form of the contact arrangement according to an aspect of the invention makes it possible to produce the conductor track 9 and its connection to the contact element 1 of the contact arrangement in one operation.

The invention claimed is:

1. A contact arrangement comprising a flat contact element with an upper side and a planar underside, the thickness of which decreases toward three of its edges from the upper side to the underside, and with a connecting element, which is electrically and mechanically connected to the contact element and is further away from the underside of the contact element than from its upper side, wherein the upper side of the contact element is planar in a central region and runs parallel to the underside and runs straight in the edge regions, so that the thickness of the edge regions tapers constantly toward the edge of the underside.

2. The contact arrangement as claimed in claim 1, in which the contact element is of a rectangular form, its underside being of a planar form and its upper side being of a convex form.

3. The contact arrangement as claimed in claim 1, in which at least part of the connecting element and part of the contact element are surrounded by a plastic housing.

4. A contact arrangement comprising a flat contact element with an upper side and an underside, the thickness of which decreases toward three of its edges from the upper side to the underside, and with a connecting element, which is electrically and mechanically connected to the contact element and is further away from the underside of the contact element than from its upper side, wherein at least part of the connecting element and part of the contact element are surrounded by a plastic housing, and wherein the plastic housing has bores for fastening to a base plate.

5. A device with a base plate and a contact arrangement arranged thereon and a conductor track, which is formed on the contact element and a region of the base plate, the contact arrangement comprising:

a flat contact element with an upper side and an underside, the thickness of which decreases toward three edges formed at respective junctions where the upper side converges with the underside; and a connecting element, which is electrically and mechanically connected to the contact element and is further away from the underside of the contact element than from the upper side.

6. The device as claimed in claim 5, in which the conductor track is sprayed on.

* * * * *